(12) United States Patent
Cates

(10) Patent No.: US 6,788,497 B1
(45) Date of Patent: Sep. 7, 2004

(54) PROTECTIVE FILM FOR MINIMIZATION OF SHIELD AND POLE TIP RECESSION IN THIN FILM SHIELDED READ HEADS AND WRITE HEADS

(75) Inventor: James C. Cates, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 10/188,478

(22) Filed: Jul. 3, 2002

Related U.S. Application Data (63) Continuation of application No. 09/452,783, filed on Dec. 2, 1999, now Pat. No. 6,445,537.

(51) Int. Cl.⁷ .............................................. G11B 5/255
(52) U.S. Cl. ..................................................... 360/126
(58) Field of Search ................................ 360/317, 318, 360/314, 315, 316, 126, 324.1, 324.8, 324.12; 29/603.11, 603.13, 603.14, 603.08; 204/192.15

(56) References Cited

U.S. PATENT DOCUMENTS

| | | | |
|---|---|---|---|
| 3,912,611 A | | 10/1975 | Royer et al. |
| 4,819,113 A | | 4/1989 | Kubota et al. |
| 4,875,987 A | * | 10/1989 | Wada et al. ............ 204/192.15 |
| 5,095,397 A | | 3/1992 | Nagata et al. |
| 5,218,497 A | * | 6/1993 | Tanabe et al. ............... 360/315 |
| 5,653,013 A | | 8/1997 | Gill et al. |
| 5,703,740 A | | 12/1997 | Coben et al. |
| 5,777,824 A | * | 7/1998 | Gray ......................... 360/234.8 |
| 5,802,700 A | | 9/1998 | Chen et al. |
| 5,850,325 A | | 12/1998 | Miyauchi et al. |
| 5,901,021 A | | 5/1999 | Hirano et al. |
| 5,949,627 A | * | 9/1999 | Williams et al. ............. 360/126 |
| 5,956,215 A | | 9/1999 | Schmalhorst et al. |
| 6,002,555 A | * | 12/1999 | Tagawa ....................... 360/126 |
| 6,038,106 A | * | 3/2000 | Aboaf et al. ................. 360/317 |
| 6,091,582 A | | 7/2000 | Komuro et al. |
| 6,112,402 A | | 9/2000 | Saito et al. |
| 6,185,077 B1 | | 2/2001 | Tong et al. |
| 6,185,078 B1 | * | 2/2001 | Lin et al. ................ 360/324.12 |
| 6,194,045 B1 | | 2/2001 | Annacone et al. |
| 6,256,863 B1 | * | 7/2001 | Saito et al. ............... 29/603.08 |
| 6,301,085 B1 | * | 10/2001 | Sato ............................ 360/317 |
| 6,313,973 B1 | * | 11/2001 | Fuke et al. ............... 360/324.1 |
| 6,445,537 B1 | * | 9/2002 | Cates ......................... 360/126 |
| 6,469,868 B2 | * | 10/2002 | Yamamoto et al. ......... 360/126 |

FOREIGN PATENT DOCUMENTS

| | | |
|---|---|---|
| EP | 0 584 707 A2 | 3/1994 |
| EP | 0700 033 A2 | 3/1996 |
| GB | 2 004 375 A | 3/1979 |
| JP | 52-137313 | 11/1977 |
| JP | 62-75918 | 4/1987 |
| WO | WO 95/18442 | 7/1995 |

* cited by examiner

Primary Examiner—Tianjie Chen
(74) Attorney, Agent, or Firm—Brooks Kushman P.C.

(57) ABSTRACT

A magnetic head having an enhanced recession resistance characteristic, and a method of fabricating the magnetic head having the enhanced recession resistance characteristic is disclosed. The improvement is the addition of one or more hard protective layers exposed edgewise at the media-head interface. Each protective layer is formed between the substrate and the top closure of the magnetic head to a thickness of greater than approximately 0.2 micrometers and a hardness of greater than approximately 850 Knoop. The protective layers are formed by depositing a hard metal film above, below or within the read and write transducers inside the magnetic head. The hard metal film is selected for its hardness, ease of use during the fabrication process, and compatibility with adjoining materials. The hard metals include, but are not limited to, chromium, iridium, rhodium, tantalum, titanium and tungsten.

26 Claims, 5 Drawing Sheets

PROTECTIVE FILM FOR MINIMIZATION OF SHIELD AND POLE TIP RECESSION IN THIN FILM SHIELDED READ HEADS AND WRITE HEADS

This application is a continuation application of prior application Ser. No. 09/452,783 filed on Dec. 2, 1999 now U.S. Pat. No. 6,445,537.

TECHNICAL FIELD

The present invention relates to the field of magnetic read and write heads used for tape and disk applications.

BACKGROUND ART

Magnetic heads used in magnetic tape applications generally consist of one or more thin film magnetic transducers fabricated on a substrate and mounted with a closure. In the transducer fabrication process, a thick overcoat layer of alumina is deposited between the magnetic transducers and the top closure. The thin film magnetic transducers include read transducers and write transducers. Read transducers typically have a magnetoresistive film, giant magnetoresistive film, or an inductive element for sensing data written in magnetic media. Write transducers are always inductive in nature for writing on the magnetic media. Multiple magnetic heads are often bound together to provide simultaneous read and write capabilities in tape drive applications.

The magnetic tape media is biased against the face of the magnetic head or heads as the media is moved longitudinally relative to the magnetic heads. Rubbing between the tape media and the magnetic heads causes both items to wear. The substrates and closures of the magnetic heads are fabricated from hard materials to help minimize their wear. The magnetic transducers and overcoat layers, on the other hand, are fabricated from materials selected primarily for their magnetic and electrical properties. (Magnetic transducer wear is not a major problem in hard disk applications because the magnetic transducers fly above the hard disk surface on a very thin layer of air.)

The difference in hardness between the substrate and closure, on the one hand, and the magnetic transducer materials and overcoat layer materials, on the other hand, results in uneven wear at the face of the magnetic head due to contact with the magnetic tape media. Since the magnetic transducer materials and overcoat layer materials are softer than the substrate and closure materials, the magnetic transducers and overcoat layers recess quicker from the media-head interface than do the substrate and closure. As a result, a concave shaped gap develops over time between the magnetic transducer and the magnetic tape media. This gap causes poor read and write performance, and even total failure of the magnetic heads in severe recession cases.

Historical attempts to minimize wear of the magnetic transducer materials have involved the utilization of harder materials in the various layers that make up the magnetic transducer. For example, cobalt-zirconium-tantalum alloys and iron-aluminum-nitrogen alloys have been used in place of the softer nickle iron alloys as the magnetic shields and poles in magnetic read transducers and magnetic write transducers respectively. In another example, alumina has been used in place of the softer silicon dioxide as a nonmagnetic bulk insulating material and write gap layer material. However, the selection of harder materials for wear resistance usually remains a secondary consideration behind the magnetic and electrical properties that determine the data recording density. What is desired is a new approach that improves the erosion characteristics of the magnetic heads without adding considerable complexity to the magnetic head fabrication process or requiring a tradeoff of the magnetic read and write performances.

DISCLOSURE OF INVENTION

The present invention is an improved method of fabricating magnetic heads and the resulting magnetic head structures. The improvement is the addition of one or more protective layers exposed edgewise at the media-head interface. Each protective layer is situated inside, adjoining or adjacent the magnetic transducers disposed within a magnetic head. Each protective layer is formed from a metal that is harder than the neighboring magnetic layers and insulating layers. The hard protective layer slows the rate at which the magnetic transducers erode and thus prolongs the life of the magnetic head.

Each protective layer added to the magnetic heads adds one extra deposition step to the fabrication process. The protective layers are deposited to a thickness ranging from greater than 0.2 micrometers to approximately 0.5 micrometers each. Thinner protective layers tend to offer insufficient resistance to erosion. Thicker protective layers provide only marginally better performance. Protective layer metals are selected based upon their hardness, ease of use during fabrication, and compatibility with adjoining materials. The protective layers require a hardness of greater than 850 Knoop to be harder than sputtered alumina, the current industrial standard. The metals include, but are not limited to, chromium, iridium, rhodium, tantalum, titanium and tungsten. Each protective layer may be patterned after deposition, as necessary, to open vias and to provide electrical isolation from other conductive layers.

Accordingly, it is an object of the present invention to provide an improved magnetic head having enhanced recession resistance characteristic. The improved may be applied to read-only, write-only, and combination read-write magnetic head configurations.

Another object of the present invention is to provide an improved method for fabricating the magnetic heads to provide the enhanced recession resistance characteristic.

These and other objects, features and advantages will be readily apparent upon consideration of the following detailed description in conjunction with the accompanying drawings.

BEST MODE FOR CARRYING OUT THE INVENTION

Several terms are used in this document in a generic sense. The term "forming" is meant to include any combination of fabrication steps that result in the deposition and patterning of a layer. This includes depositing a layer followed by a subsequent patterning using a masking layer to control the removal of unwanted material. It also includes the deposition of a patterning mask layer used to control a subsequent deposition. The term "deposition" is any method of creating a layer of material on the existing surface. Deposition includes sputtering, evaporation, chemical vapor deposition, plating and other like methods known in the art. The term "patterning" is any method of defining a geometric area or areas where a layer will and will not exist. Patterning includes wet chemical etching, electrochemical machining, lift off techniques, ion milling, focused ion beams and other like methods used in the art. The figures used in the discussion of the invention are enlarged for illustrative purposes and are not drawn to scale.

Figure 1:
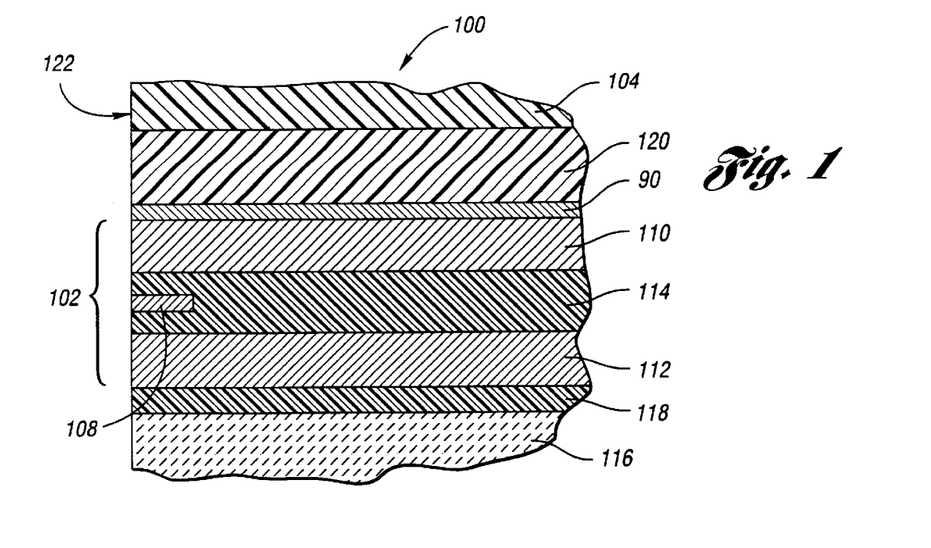
FIG. 1 is a profile of a first embodiment of a magnetic read head fabricated according to the present invention.

A profile of a magnetic read head 100 fabricated according to the present invention is shown in FIG. 1. The magnetic read head 100 has a magnetic read transducer 102 situated between a top closure 104 and a substrate 116 The read transducer 102 includes a sensor element 108 that may be a magnetoresistive film, a giant magnetoresistive film, or other magnetically sensitive device known in the art. A top shield 110 and a bottom shield 112 are provided above and below the sensor element 108 respectively to improve the spatial resolution of the sensor element 108. Insulator 114 separates the sensor element 108 from the top shield 110 and the bottom shield 112. Substrate 116 provides a base upon which the transducer 102 is fabricated. An undercoat 118 is generally, although not necessarily, provided between the substrate 116 and the bottom shield 112. An overcoat 120 is formed on the top shield 110 and then lapped flat to provide a planar surface to bond to the top closure 104. One edge of the top closure 104, overcoat 120, read transducer 102, undercoat 118, and substrate 116 collectively form a media bearing surface 122 for the magnetic read head 100.

The present invention is the addition of one or more protective layers situated between the substrate 116 and the top closure 104 and interfacing with the media bearing surface 122. FIG. 1 shows the first and preferred embodiment of the magnetic read head 100 where a single protective layer 90 is provided between the top shield 110 and the overcoat 120. In alternative embodiments, the number and positions of the protective layers may be varied to provide the desired recession resistance characteristics for the magnetic read head 100. Several alternative embodiments will be described later. The presence or absence of the closure 104 is independent of the present invention and are included for illustrative purposes only.

The protective layer 90 is formed by depositing and patterning, if necessary, a hard metal film. Patterning may be required to open vias (not shown) in the protective layer 90 and to provide electrical isolation from other conductors (not shown) running vertically within the magnetic read head 100. Deposition of the protective layer 90 may be accomplished by any means known in the art such as sputtering, evaporation, chemical vapor deposition, plating and the like. Likewise, patterning of the protective layer 90 may be accomplished by any means known in the art such as wet and dry chemical etching, lift off, ion milling, reactive ion etching, plating masks and the like. The only limitation on the deposition and patterning processes is compatibility with the layers on which the protective layer 90 is formed.

Thickness of the protective layer 90 is typically 0.5 micrometers. The thickness may be increased or decreased depending upon the desired recession resistance characteristics, the number of other protective layers provided, the type of metals being employed, positioning of the protective layer 90 with respect to the other layers, and cost. A practical minimum thickness for the protective layer 90 is approximately 0.2 micrometers. Improvements in the recession resistance characteristics provided by a thinner protective layer usually do not justify the added expense of forming that protective layer.

Protective layer 90 may be formed from a single metal or a metal alloy. The metals are chosen for their hardness, ease of deposition, easy of patterning, compatibility with other materials they contact, and their ability to adhere with neighboring layers. The hardness of the protective layer 90 is selected to be greater than that of the read transducer 102 and overcoat 120. Compatibility with other materials includes diffusion of the protective layer 90 into the neighboring materials, or vice versa, that may change the properties of the respective layers. Compatibility may also include galvanometric differences between the protective layer 90 and the adjoining materials that can result in corrosion.

Figure 2:
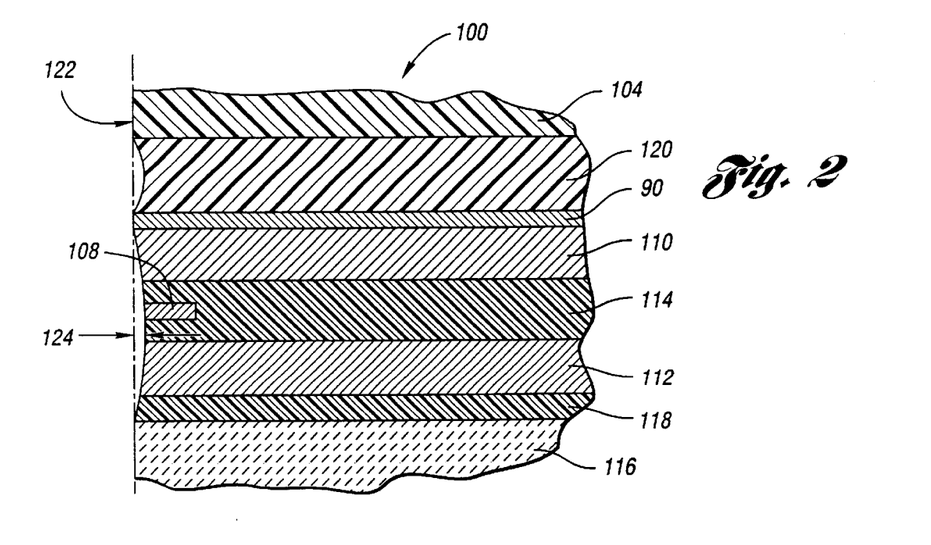
FIG. 2 is a profile of the first embodiment of the magnetic read head showing recession.

Near the end of the magnetic read head's 100 fabrication process, the side of the head that is to face the magnetic media (not shown) is lapped to create a smooth surface. This smooth surface is referred to as an air bearing surface in disk drive heads, and a tape bearing surface in a tape drive head. This document refers to the lapped surface as the media bearing surface 122 in a generic sense. Lapping of the media bearing surface 122 results in recession of the read transducer 102 and the overcoat layer 120, as shown in FIG. 2. Recession is caused by the read transducer 102 and the overcoat layer 120 eroding at a faster rate than the relatively harder substrate 116 and top closure 104.

Common magnetic materials used in the fabrication of the read transducer 102 include Permalloy (80:20 NiFe) and Cobalt Zirconium Tantalum (CZT). Alumina is the industrial standard nonmagnetic material for the insulating layer 114 and overcoat layer 120. Plated Permalloy is the softest of these three materials with a hardness of approximately 660 Knoop. Vacuum deposited CZT has a hardness of approximately 740 Knoop. Sputtered alumina is harder at approximately 850 Knoop. For comparison, the substrate 116 and top closure 104 are often, although not necessarily, made of AlTiC that has a hardness of approximately 2480 Knoop Table I shows the initial shield recession, indicated by dimension 124, of four sample magnetic read heads 100 caused by lapping the media bearing surface 112. All four samples were fabricated for use with magnetic tapes (not shown). Sample 1 and sample 2 were fabricated without the protective layer 90. Sample 3 and sample 4 include a 0.5 micrometer tantalum protective layer 90 vacuum deposited on the top shield 110. After lapping, the measured shield recession 124 of the four samples ranged from 8 to 10.6 nanometers in depth. Sample 1 and sample 2 were then mounted flanking a magnetic write head in a first read-write-read group. Likewise, sample 3 and sample 4 where mounted in a second read-write-read group.

Five million feet of magnetic tape were then moved across each of the two combined heads to simulate normal operation. The final shield recessions 124, ranged from 10.2 to 21 nanometers, as shown in Table I. Recession increase was calculated by the formula 100×(final recession−initial recession)/initial recession. Note that the presence of the protective layer 90 in sample 3 and sample 4 resulted in significantly lower shield recession increases.

TABLE I

Shield Recession Test Results

|  | CZT shield without a Protective Layer | | CZT shield with Ta Protective Layer | |
| --- | --- | --- | --- | --- |
|  | Sample 1 | Sample 2 | Sample 3 | Sample 4 |
| Initial recession (nm) | 8 | 9.6 | 10.6 | 10.2 |
| Final recession (nm) | 21 | 14.8 | 11.5 | 10.2 |
| Recession increase (%) | 162 | 54 | 8.5 | 0.0 |

The improved recession resistance characteristics of sample 1 and sample 2 are attributable to the approximate 930 Knoop hardness of the titanium protective layer 90 as compared with the approximately 740 Knoop hardness of the top shield 110 and the approximately 850 Knoop (820 on a Vickers scale) hardness of the overcoat layer 120. Other metals that are readily available and well suited to thin film fabrication include, but are not limited to chromium (935 Knoop), iridium(1760 Vickers), rhodium (1246 Vickers), tantalum (875 Knoop), and tungsten (1400 Knoop).

Figure 3:
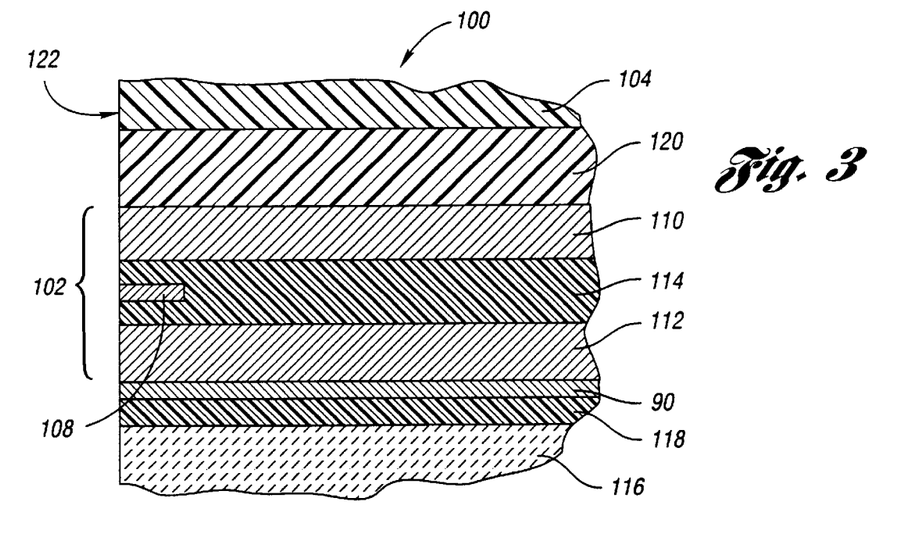
FIG. 3 is a profile of a second embodiment of the magnetic read head.
Figure 4:
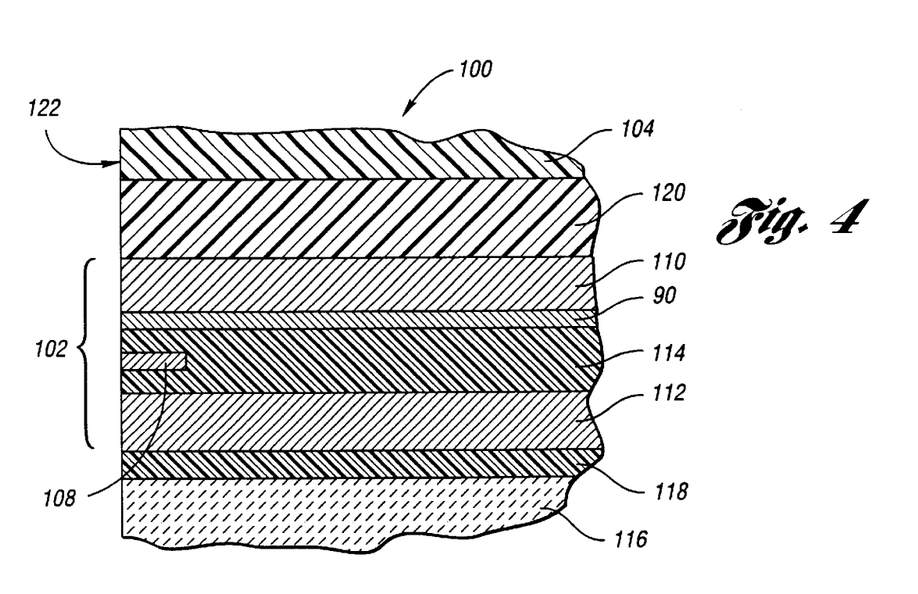
FIG. 4 is a profile of a third embodiment of the magnetic read head.

The protective layer 90 may be located anywhere in proximity to the read transducer 102. Here, proximity means anywhere between the substrate 116 and the top closure 104, if present. When the magnetic read head 100 does not include a top closure 104, then the protective layer 90 may be anywhere from next to the substrate 116 to being the top layer. FIG. 3 and FIG. 4 show two alternative embodiments where the protective layer 90 is situated at other locations between the substrate 116 and the top closure 104.

FIG. 3 is a profile of a second embodiment of a magnetic read head fabricated in accordance with the present invention. Here the protective layer 90 exists between the bottom shield 112 and the substrate 116. This placement of the protective layer 90 improves the shield recession resistance characteristics of the bottom shield 112. The resulting improvement, though, is often limited due to the closeness of the hard substrate 116 that also operates to help reduce the recession of the bottom shield 112 in conventional configurations. To improve the recession resistance characteristics of both shields 110 and 112, two protective layers 90 could be formed, one below the bottom shield 112, as shown in FIG. 3, and a second formed above the top shield 110, as shown in FIG. 1.

FIG. 4 is a profile of a third embodiment of the magnetic read head fabricated in accordance with the present invention. Here the protective layer 90 is embedded within the read transducer 102 between the sensor element 108 and the top shield 110. Insulating layer 114 extends between the sensor element 108 and the protective layer 90 to prevent an electrical short circuit of the sensor element 108 by the protective layer 90. This third embodiment offers better recession protection for the sensor element 108 than the first and second embodiments shown in FIG. 1 and FIG. 3 respectively when the same thickness protective layer 90 is used. The better recession protection is due to the closer positioning of the protective layer 90 to the sensor element 108. One disadvantage of the third embodiment is that the spacing between the sensor element 108 and the shields 110 and 112 are becoming smaller with each new generation of read transducer 102. Consequently, the protective layer 90 must be made thinner thus diminishing its ability to slow erosion and recession.

Figure 5:
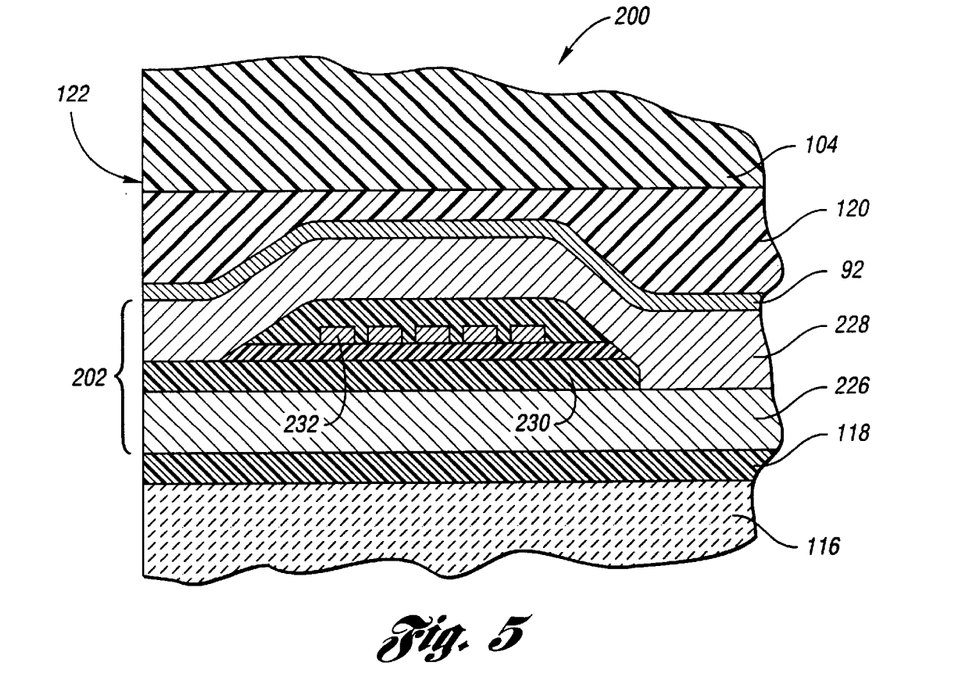
FIG. 5 is a profile of a first embodiment of a magnetic write head fabricated according to the present invention.

The present invention may also be applied to a magnetic write head 200, as shown in part in FIG. 5. Similar to the magnetic read head 100, the magnetic write head 200 consists of a write transducer 202 fabricated on the substrate 116 or undercoat layer 118, topped by the overcoat layer 120, and mounted with the top closure 104. The write transducer 202 usually, although not necessarily, consists of a bottom pole 226 and a top pole 228 separated from each other at the media bearing surface 122 by a nonmagnetic write gap layer 230. A coil 232 disposed between the top pole 228 and bottom pole 226 induces a magnetic flux in the poles 228 and 226 that fringe around the write gap layer 230 at the media bearing surface 122 to write in the magnetic media (not shown).

The present invention is the addition of one or more protective layers 92 proximate the write transducer 202, anywhere between the substrate 116 and top closure 104 and exposed at the media bearing surface 112. FIG. 5 shows the first and preferred embodiment where the protective layer 92 is situated overlaying the top pole 228. Protective layer 92 is formed by depositing a metal or metal alloy overlaying the top pole 228. The protective layer 92 is then patterned to avoid electrical and mechanical interference with electrical leads (not shown) that connect to the coil 232 and possibly other layers not shown. Protective layer 92 in the magnetic write head 200 provides the same erosion protection to the top pole 228 that the protective layer 90 in the magnetic read head 100 provides to the top shield 110. By forming the protective layer 92 of a harder material than the top pole 228 and overcoat layer 120, the recession rate of the top pole 228 is reduced. Since typical magnetic materials for the write transducer's poles 226 and 228 are Permalloy and CZT, the same metals used for the protective layer 90 or layers in the magnetic read head 100 can be used for the protective layer 92 or layers in the magnetic write head 200.

Figure 6:
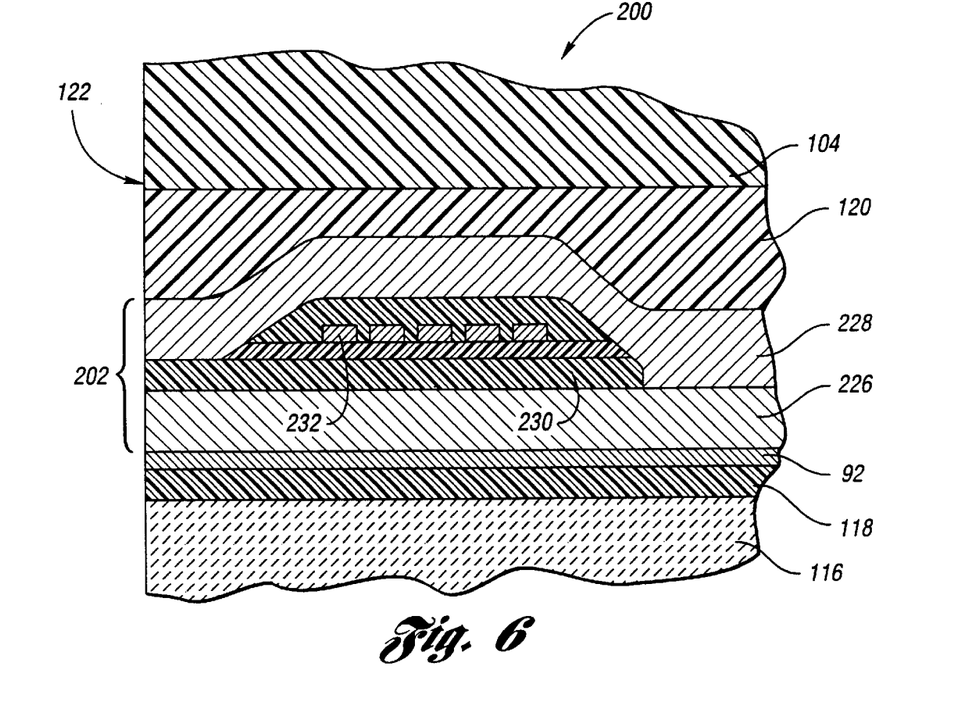
FIG. 6 is a profile of a second embodiment of the magnetic write head.
Figure 7:
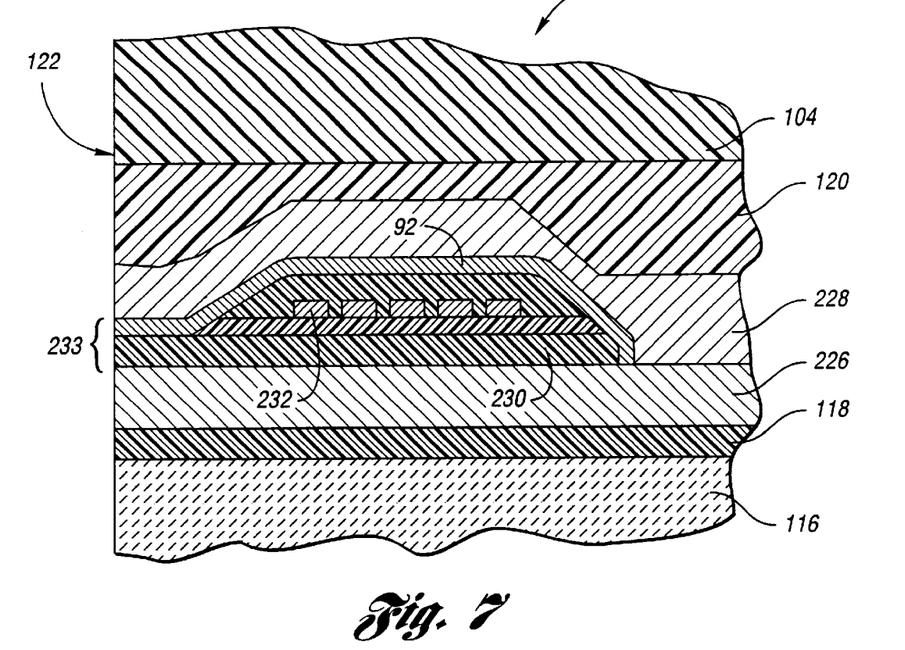
FIG. 7 is a profile of a third embodiment of the magnetic write head.

FIG. 6 and FIG. 7 are profiles of a second and third embodiment of the magnetic write head respectively fabricated in accordance with the present invention. In the second embodiment shown in FIG. 6, the protective layer 92 is located between the substrate 116 and the bottom pole 226. This configuration provides better recession resistance characteristics for the bottom pole 226, but again the full effect to the protective layer 92 in this position is overshadowed by the nearby hard substrate 116. In the third embodiment shown in FIG. 7, the protective layer 92 is located between the top pole 228 and the write gap layer 230. In this case, if the protective layer 92 is nonmagnetic then it operates as part of the write gap distance, distance 233, between the pole tips of the top pole 228 and bottom pole 226 at the media bearing surface 122.

Figure 8:
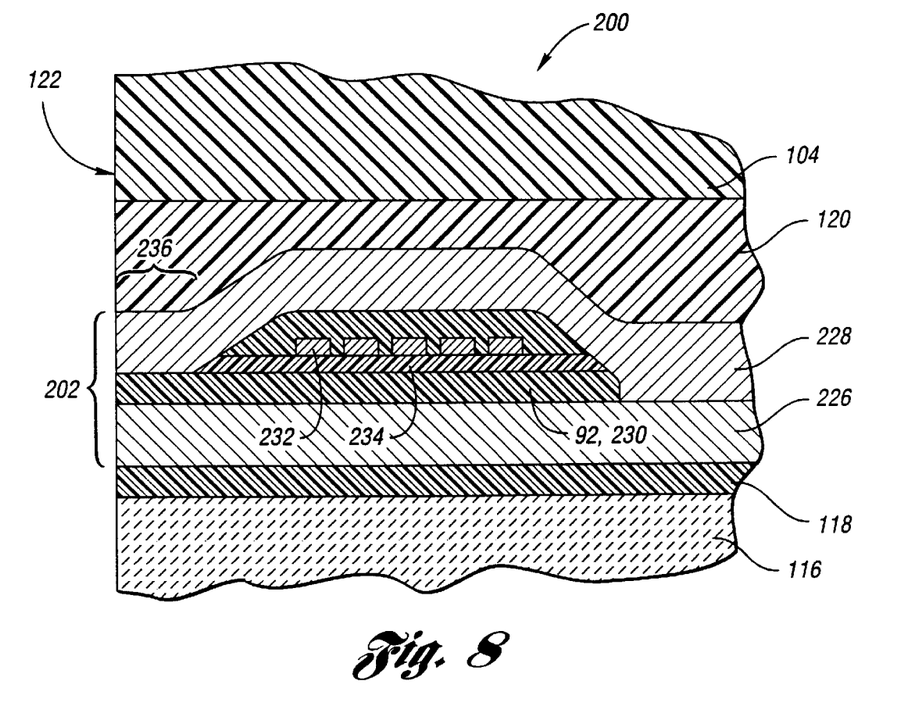
FIG. 8 is a profile of a fourth embodiment of the magnetic write head.

FIG. 8 is a profile of a third embodiment of the magnetic write head fabricated in accordance with the present invention. In this embodiment, the protective layer 92 and the write gap layer 230 are one in the same. This configuration potentially simplifies the fabrication process since the inclusion of the protective layer 92 may add no additional steps. The protective layer 92 material is deposited and patterned in place of the industrial standard alumina. Because of its operation as the write gap, the protective layer 92 in this third embodiment must be formed from a nonmagnetic material, such as the metals listed earlier. Since a metal write gap layer 230/protective layer 92 is electrically conductive, an electrical insulator must be provided between this layer and the coils 232 to prevent electrical short circuiting of the coils 232. This is accomplished by a planarization layer 234 that is normally formed overlaying the write gap layer 230 anyway to provide a planar surface on which the coils 232 are fabricated. Alternatively, the write gap layer 230/protective layer 92 may be patterned to reside in the zero throat area, shown as area 236, only. This design still requires that the planarization layer 234 or other insulating layer be formed over the bottom pole 226 to isolate the coils 232 from the bottom pole 226 electrically.

Figure 9:
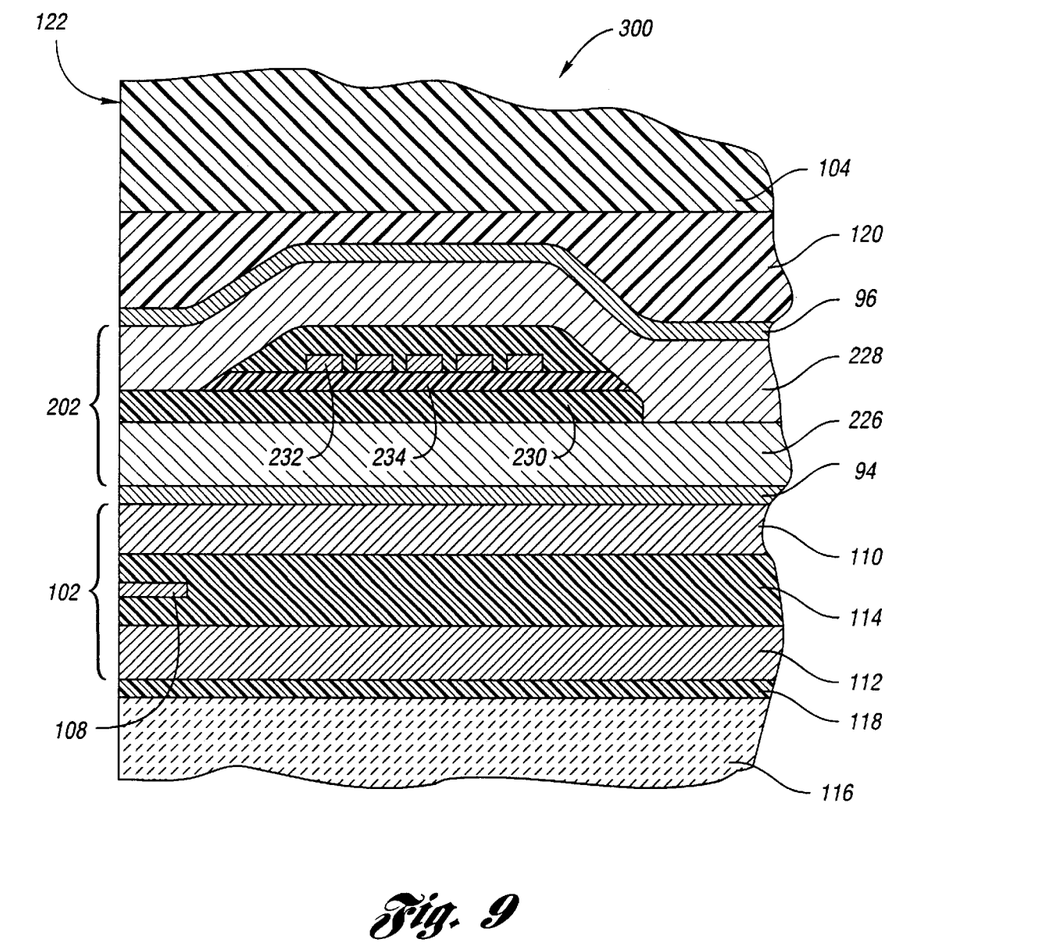
FIG. 9 is a profile of a combination magnetic read and write head fabricated according to the present invention.

The present invention may be applied to magnetic heads having multiple transducers disposed between the substrate 116 and the overcoat 120. FIG. 9 shows a common multiple transducer configuration where a write transducer 202 is fabricated on top of a read transducer 102 to form a combined magnetic head 300. FIG. 9 also shows an example of a magnetic head having multiple protective layers, in particular, a first protective layer 94 and a second protective layer 96.

Within the combination magnetic head 300, the read transducer 102 and a write transducer 202 normally share a common magnetic layer (not shown). This common magnetic layer acts as both the top shield 110 of the read transducer 102, and as the bottom pole 226 of the write transducer 202. While this approach saves on fabrication complexity by forming only one layer for both transducers, there is a tradeoff in transducer performance. From the write transducer's 202 perspective, the common magnetic layer should have a high saturation magnetization characteristic for compatibility with high coercivity magnetic media. From the read transducer's 102 perspective, the common magnetic layer should have a high permeability for shielding the sensor element 108 from stray magnetic fields and a stable magnetic domain configuration. Existing magnetic materials used in thin film transducer fabrication tend to have excellent characteristics for one of these applications, but not both simultaneously.

Adding the first protective layer 94 to the combined magnetic head 300 provides a mechanism that allows the top shield 110 and the bottom pole 226 to be fabricated from different magnetic materials. The top shield 110 may be formed from a high permeability material and the bottom pole 226 from a high magnetization saturation material with a stable magnetic domain configuration. First protective layer 94 acts as barrier that prevents the two different magnetic materials from inter-diffusing during fabrication and life span of the combined magnetic head 300. First protective layer 94 also provides recession protection for both the write transducer 202 and the read transducer 102. The second protective layer 96 is formed above the top pole 228. In this example, an extra insulating layer 238 of alumina is deposited and patterned between the top pole 226 and the second protective layer 96. This allows the second protective layer 96 to be electrically isolated from the top pole 228 if required.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A magnetic head comprising:
   a substrate;
   an overcoat overlaying the substrate;
   a magnetic read transducer disposed between the substrate and the overcoat, the magnetic read transducer including a shield made of a first magnetic material;
   a magnetic write transducer disposed between the substrate and the overcoat, the magnetic write transducer including a pole made of a second magnetic material different than the first magnetic material; and
   a protective layer sandwiched between the shield and the pole, wherein the protective layer is not a write gap layer, and wherein the protective layer acts as a barrier that prevents the first and second magnetic materials from inter-diffusing during fabrication of the magnetic head.

2. The magnetic head of claim 1 wherein the protective layer comprises metal.

3. The magnetic head of claim 1 wherein the protective layer comprises metal selected from a group of metals consisting of chromium, iridium, rhodium, tantalum, titanium and tungsten.

4. The magnetic head of claim 1 wherein the protective layer has a thickness greater than approximately 0.2 micrometers.

5. The magnetic head of claim 1 wherein the protective layer has a hardness greater than approximately 850 Knoop.

6. The magnetic head of claim 1 wherein the protective layer comprises metal and has a thickness greater than approximately 0.2 micrometers.

7. The magnetic head of claim 1 wherein the protective layer comprises metal and has a hardness greater than approximately 850 Knoop.

8. The magnetic head of claim 1 wherein the protective layer is disposed between the substrate and the magnetic write transducer.

9. The magnetic head of claim 1 further comprising an additional protective layer disposed between the magnetic write transducer and the overcoat.

10. The magnetic head of claim 1 wherein the protective layer provides recession protection for both the magnetic read transducer and the magnetic write transducer.

11. The magnetic head of claim 1 further comprising a media bearing surface, wherein the substrate at least partially defines the media bearing surface, and wherein the magnetic read transducer, the magnetic write transducer and the protective layer each interface edgewise with the media bearing surface.

12. A magnetic head comprising:
   a substrate;
   an overcoat overlaying the substrate;
   a magnetic read transducer disposed between the substrate and the overcoat, the magnetic read transducer including a shield made of a magnetic material; and
   a protective layer disposed adjacent to the shield, the protective layer having a thickness greater than approximately 0.2 micrometers and a hardness greater than approximately 850 Knoop, wherein the protective layer is not a write gap layer, and wherein the protective layer is made of metal.

13. The magnetic head of claim 12 wherein the protective layer is disposed between the shield and the substrate.

14. The magnetic head of claim 12 wherein the protective layer is disposed between the shield and the overcoat.

15. The magnetic head of claim 12 wherein the protective layer comprises metal selected from a group of metals consisting of chromium, iridium, rhodium, tantalum, titanium and tungsten.

16. The magnetic head of claim 12 further comprising a magnetic write transducer disposed between the substrate and the overcoat, wherein the protective layer provides recession protection for both the magnetic read transducer and the magnetic write transducer.

17. The magnetic head of claim 12 further comprising a magnetic write transducer disposed between the substrate and the overcoat, the magnetic write transducer including a pole made of a magnetic material, wherein the protective layer is sandwiched between the pole and the shield.

18. The magnetic head of claim 17 wherein the magnetic material of the shield is different than the magnetic material of the pole, and wherein the protective layer acts as a barrier that impedes inter-diffusion of the shield and the pole during fabrication of the magnetic head.

19. The magnetic head of claim 12 further comprising a media bearing surface, wherein the substrate at least partially defines the media bearing surface, and wherein the magnetic read transducer and the protective layer each interface edgewise with the media bearing surface.

20. A magnetic head comprising:

a substrate;

a magnetic read transducer overlaying the substrate, the magnetic read transducer including a shield made of a first magnetic material;

a magnetic write transducer overlaying the substrate, the magnetic write transducer including a write gap layer and a pole made of a second magnetic material different than the first magnetic material; and a protective layer sandwiched between the shield and the pole, wherein the protective layer is made of metal and is disposed between the substrate and the magnetic write transducer;

wherein the shield and the pole are each disposed between the read sensor element and the write gap layer.

21. The magnetic head of claim 20 wherein the protective layer has a thickness greater than approximately 0.2 micrometers.

22. The magnetic head of claim 20 wherein the protective layer has a hardness greater than approximately 850 Knoop.

23. A magnetic head comprising:

a substrate;

a magnetic read transducer overlaying the substrate, the magnetic read transducer including a read sensor element and a shield made of a magnetic material, the shield being disposed between the read sensor element and the substrate; and a protective layer disposed adjacent to the shield and between the shield and the substrate, the protective layer being made of metal and having a thickness greater than approximately 0.2 micrometers and a hardness greater than approximately 850 Knoop.

24. A magnetic head comprising:

a substrate;

an overcoat overlaying the substrate;

a magnetic read transducer disposed between the substrate and the overcoat, the magnetic read transducer including a shield made of a first magnetic material;

a magnetic write transducer disposed between the substrate and the overcoat, the magnetic write transducer including a pole made of a second magnetic material different than the first magnetic material; and a protective layer disposed between the shield and the pole, wherein the protective layer is not a write gap layer, and wherein the protective layer comprises metal selected from a group of metals consisting of chromium, iridium, rhodium, tantalum, titanium and tungsten.

25. A magnetic head comprising:

a substrate;

an overcoat overlaying the substrate;

a magnetic read transducer sandwiched between the substrate and the overcoat, the magnetic read transducer including a read sensor element and a shield made of a first magnetic material;

a magnetic write transducer disposed between the substrate and the overcoat, the magnetic write transducer including a write gap layer and a pole made of a second magnetic material different than the first magnetic material; and protective layer sandwiched between the shield and the pole, wherein the protective layer is not a write gap layer, and wherein the protective layer is made of metal and has a hardness greater than approximately 850 Knoop;

wherein the shield and the pole are each disposed between the read sensor element and the write gap layer.

26. A magnetic head comprising:

a substrate;

an overcoat overlaying the substrate;

a magnetic read transducer disposed between the substrate and the overcoat, the magnetic read transducer including a read sensor element and a shield made of a magnetic material, the shield being disposed between the read sensor element and the overcoat; and a protective layer disposed adjacent to the shield, the protective layer being made of metal and having a thickness greater than approximately 0.2 micrometers and a hardness greater than approximately 850 Knoop, wherein the protective layer is not a write gap layer, and wherein the protective layer is disposed between the shield and the overcoat.

* * * * *